United States Patent [19]
Chaffee et al.

[11] Patent Number: 5,684,375
[45] Date of Patent: Nov. 4, 1997

[54] METHOD AND APPARATUS FOR TUNING A MOTION CONTROL SYSTEM

[75] Inventors: Mark A. Chaffee, Etna, N.H.; Thomas J. Rehm, Mequon, Wis.

[73] Assignee: Allen-Bradley Company, Inc., Milwaukee, Wis.

[21] Appl. No.: 492,554

[22] Filed: Jun. 20, 1995

[51] Int. Cl.$^6$ ..................................................... G05B 1/06
[52] U.S. Cl. ........................... 318/638; 318/565; 318/630
[58] Field of Search .................................... 318/638, 560, 318/565, 568.18, 568.22, 568.24, 569, 567, 600, 609, 610, 615, 618, 650, 630, 652, 671

[56] References Cited

U.S. PATENT DOCUMENTS

| | | | |
|---|---|---|---|
| 4,609,855 | 9/1986 | Andrews | 318/619 X |
| 4,633,152 | 12/1986 | Farr | 318/560 X |
| 4,988,935 | 1/1991 | York | 318/568.18 X |
| 5,012,169 | 4/1991 | Ono et al. | 318/569 X |
| 5,223,778 | 6/1993 | Svarovsky et al. | 318/610 |
| 5,343,132 | 8/1994 | Irashita | 318/630 |
| 5,371,450 | 12/1994 | Hiraoka | 318/560 |
| 5,416,397 | 5/1995 | Mazzara et al. | 318/560 X |
| 5,471,296 | 11/1995 | Parker et al. | 318/560 X |
| 5,475,291 | 12/1995 | Yoshida et al. | 318/568.22 |

*Primary Examiner*—Karen Masih
*Attorney, Agent, or Firm*—Patrick S. Yoder; John M. Miller; John J. Horn

[57] ABSTRACT

A tuning method and apparatus are provided for tuning gain values in a motion control system. The system is of the type including an input device for generating position command signals, an actuator for displacing a physical element to a desired location in response to control signals, a sensor for generating feedback signals representative of the position of the physical element and a controller coupled to the input device, the sensor and the actuator for processing the command and feedback signals and generating control signals for driving the actuator in response to the command and feedback signals. The controller multiples at least one parameter error signal derived from the command and feedback signals by a gain value to generate the control signals. The technique includes the steps of accelerating and decelerating the actuator and monitoring the feedback signals during the acceleration and deceleration phases of motion. Based upon the control signals used to drive the actuator, the acceleration and deceleration times, and characteristics of the control system, a position bandwidth signal is generated and key gain values are generated based upon the bandwidth signal. The single motion event used for tuning is unidirectional and requires only a minimal displacement of the actuator.

19 Claims, 7 Drawing Sheets

METHOD AND APPARATUS FOR TUNING A MOTION CONTROL SYSTEM

BACKGROUND OF THE INVENTION

The present invention relates generally to the art of electronic motion control systems, especially position control systems. More particularly, the invention relates to a method and apparatus for automatically tuning certain key parameters such as gains and dynamic parameters in such systems.

A great number of industrial and research applications presently exist for sophisticated positioning systems capable of accurately and repeatably moving machine elements and workpieces at precise speeds to precise locations. Such systems generally include an actuator or servo positioning device, such as a DC motor, and an electronic feedback control system for driving the actuator in response to command signals representative of desired positions of an element directly or indirectly coupled to the actuator. The system may include a single or multiple control axes, each independently controlled by a single controller. Command signals typically originate in a manual or computer interface, such as a computer terminal, while feedback signals are provided by a position sensing device such as a digital incremental encoder. Control circuitry generally includes analog or digital electronics capable of manipulating the input and feedback signals in accordance with a predetermined control routine and developing control signals as dictated by the routine. These control signals are fed to a servo amplifier where they are converted to drive signals for driving the actuator to the desired position and at desired velocity and acceleration rates. Typical applications for such systems vary widely and include industrial robots, machine tools, product assembly stations as well as entire assembly lines.

Control circuitry for many modern position control systems typically includes a microprocessor and associated memory and signal conditioning circuits capable of storing and implementing the system's general control routine, as well as parameters specific to the hardware being driven or positioned. Such digital systems offer distinct advantages over more conventional analog control systems, including their ability to be reconfigured when desired, their part-to-part consistency and their relative insensitivity to environmental conditions that can cause drift and affect predictability in analog systems. Through an encoded series of processing steps implemented through a cyclic sampled data technique, such digital systems effectively model a classical control system, but provide a great deal of flexibility for adapting the routine to the particular needs of a specific application.

Application, or hardware-specific parameters, most often in the form of various system gains, permit control systems of the type described above to be tailored to the physical constraints of the system components and of the elements being positioned, such as the force or torque available from an actuator or the size and weight of the machine elements coupled to the actuator. In one known control system of this type, commercially available under the designation "S Class" motion control systems from the Allen-Bradley Company, a digital microprocessor-based controller is preconfigured to implement a nested digital servo loop control routine for each controlled axis. The controller receives position command and feedback input signals and models a classic position control circuit including position proportional and integral control and velocity feedforward control. Moreover, the system can be set up to model a velocity loop internally where the characteristics of the system servo amplifier are known or can be configured to implement control based upon an external velocity loop where desired.

Tailoring such systems to a particular application generally requires tuning gain values associated with each parameter on which control is based and for each controlled axis. Which specific gains require such tuning depends upon the control model implemented by the system. These typically include proportional, derivative, integral and feedforward gains. Properly tuning the system gains optimizes system performance while avoiding instability. For example, in the S Class position control systems mentioned above, increasing proportional velocity gain results in smoother motion, enhanced acceleration, reduced overshoot and greater system stability. However excessive velocity gain may cause high frequency instability. Similarly, increasing proportional position gain decreases response time and increases the "stiffness" of the system, while excessive proportional position gain leads to system instability. Increased integral and feedforward gains reduce steady-state and following errors respectively, but can also degrade system performance and stability if set too high for the system hardware components.

Several approaches are known for tuning system gains in position control systems, some of which employ so-called "auto-tuning techniques" in which the control circuitry determines the optimal level of the system gains with little operator intervention. In one such technique, the system controller tunes velocity and position proportional gains and position integral gain for each controlled axis by progressively incrementing the gain being tuned and driving the axis actuator bidirectionally until a point of instability is detected based upon feedback from the position sensor. The gain is then set at a predetermined fraction of the level at which instability occurred. Maximum dynamic capabilities for the drive/motor system, including maximum acceleration, deceleration and speed levels, may then be determined by driving the system at full scale output using the tuned gains. Feedforward gain may also be tuned by progressively increasing the gain level until following error is reduced below a preset threshold. By thus working through each gain for each axis, the controller determines the optimal level of each gain. The tuned gains are stored in memory and are used to generate appropriate control signals each time displacement of the actuator is commanded. The tuning routine is carded out upon initial installation of the system and after replacement or servicing of system hardware.

While such auto-tuning techniques have alleviated the need for complex and time-consuming manual tuning, they are not without drawbacks. For example, in the technique described above, several separate tuning algorithms must actually be run sequentially for each controlled axis. Because the controller drives the actuator bi-directionally and repeatedly for each gain being tuned to identify points of instability, these techniques result in significant movement of the actuator and the load attached to it. Such movement can result in damage to system hardware. Moreover, in high inertia applications, residual motion at the end of a motion profile may be interpreted by the controller as oscillation (i.e. the instability flag used to identify the upper margin of acceptable gain), resulting in very "soft" gain setting.

SUMMARY OF THE INVENTION

The present invention features a novel auto-tuning technique for motion control systems that permits tuning of system gains and dynamic parameters in a simple, straightforward procedure. The technique preferably utilizes a "single-step" approach requiring only a single small, unidirectional motion event. Information collected during movement of the actuator is used to determine the optimal level of several system gains and dynamic parameters, providing an application-ready position servo loop for a wide variety of motion control applications. Because the key system parameters are determined during the tuning sequence based upon the system performance during the motion event, very little information is needed from the system operator on the performance characteristics of the drive, the actuator or the feedback device.

Thus, in accordance with a first aspect of the invention, a method is provided for tuning a motion control system. The system is of the type including a command device for generating position command signals, an actuator for displacing a physical element to a desired location in response to control signals, a sensor for generating feedback signals representative of the position of the physical element and a controller coupled to the command device, the sensor and the actuator for processing the command and feedback signals and generating control signals for driving the actuator in response to the command and feedback signals. In generating the control signals, the controller multiplies at least one parameter error signal derived from the command and feedback signals by a gain value. The method includes the steps of applying a first control signal to the actuator to accelerate the actuator in a predetermined direction and applying a second control signal to the actuator to decelerate the actuator in the predetermined direction. Values representative of operating parameters of the control system during the acceleration and deceleration steps are recorded and the gain value is generated based upon the recorded operating parameters.

In accordance with another aspect of the invention, a method is provided for tuning a motion control system of the type including a command device for generating position command signals, an actuator for displacing a physical element to a desired location in response to drive signals, a sensor for generating feedback signals representative of the position of the physical element and a controller coupled to the command device, the sensor and the actuator for processing the command and feedback signals and generating drive signals for driving the actuator in response to the command and feedback signals. The controller multiplies at least one parameter error signal derived from the command and feedback signals by a gain value to generate the drive signals. In accordance with this aspect of the invention, the method includes the steps of applying a first drive signal at a predetermined level to the actuator to accelerate the actuator to a predetermined velocity and applying a second drive signal to the actuator to decelerate the actuator. The feedback signals are monitored during the acceleration and deceleration and acceleration and deceleration times are recorded. The gain value is generated based upon the predetermined levels of the first and second drive signals, and the acceleration and deceleration times.

In accordance with yet another aspect of the invention, a method for tuning a motion control system includes the steps of applying a first drive signal at a predetermined level to an actuator to accelerate the actuator to a predetermined velocity and applying a second drive signal at a predetermined level to the actuator to decelerate the actuator. Feedback signals are monitored during the acceleration and deceleration and acceleration and deceleration times are recorded. System gains and dynamic characteristics are then generated based upon the predetermined levels of the first and second drive signals, and the acceleration and deceleration times. In a particularly preferred embodiment, the gains include position and velocity loop proportional gains and the dynamic characteristics include maximum system acceleration and deceleration rates.

In accordance with a further aspect of the invention, an apparatus is provided for tuning a motion control system of the type including a command device for generating position command signals, an actuator for displacing a physical element to a desired location, a drive circuit for driving the actuator in response to control signals, a sensor for generating feedback signals representative of the position of the physical element and a controller coupled to the command device, the sensor and the drive circuit for processing the command and feedback signals and generating control signals for driving the actuator in response to the command and feedback signals. The controller multiplies at least one parameter error signal derived from the command and feedback signals by a gain value to generate the control signals. The apparatus includes a control signal generating circuit, a monitoring circuit, a signal processing circuit and a memory circuit. The control signal generating circuit is coupled to the drive circuit and generates and applies control signals to the drive circuit to accelerate and decelerate the actuator during a tuning sequence. The monitoring circuit is coupled to the sensor and monitors the feedback signals during the tuning sequence. The signal processing circuit is coupled to the monitoring circuit and to the control signal generating circuit and generates a signal representative of the gain value based upon the control signals applied during the tuning sequence and the feedback signals monitored during the tuning sequence. The memory circuit stores the signal representative of the gain value for use in subsequent displacements of the actuator.

BRIEF DESCRIPTION OF THE DRAWINGS

The present invention will become more fully understood from the following detailed description, taken in conjunction with the accompanying drawings, wherein like reference numerals refer to like parts, in which:

FIG. 4 (A through C) is a flow chart illustrating steps in typical control logic for implementing the tuning technique of the invention on the motion control system illustrated in FIG. 1 through use of the functional circuits shown in FIG. 3;

DESCRIPTION OF THE PREFERRED EMBODIMENTS

Figure 1:
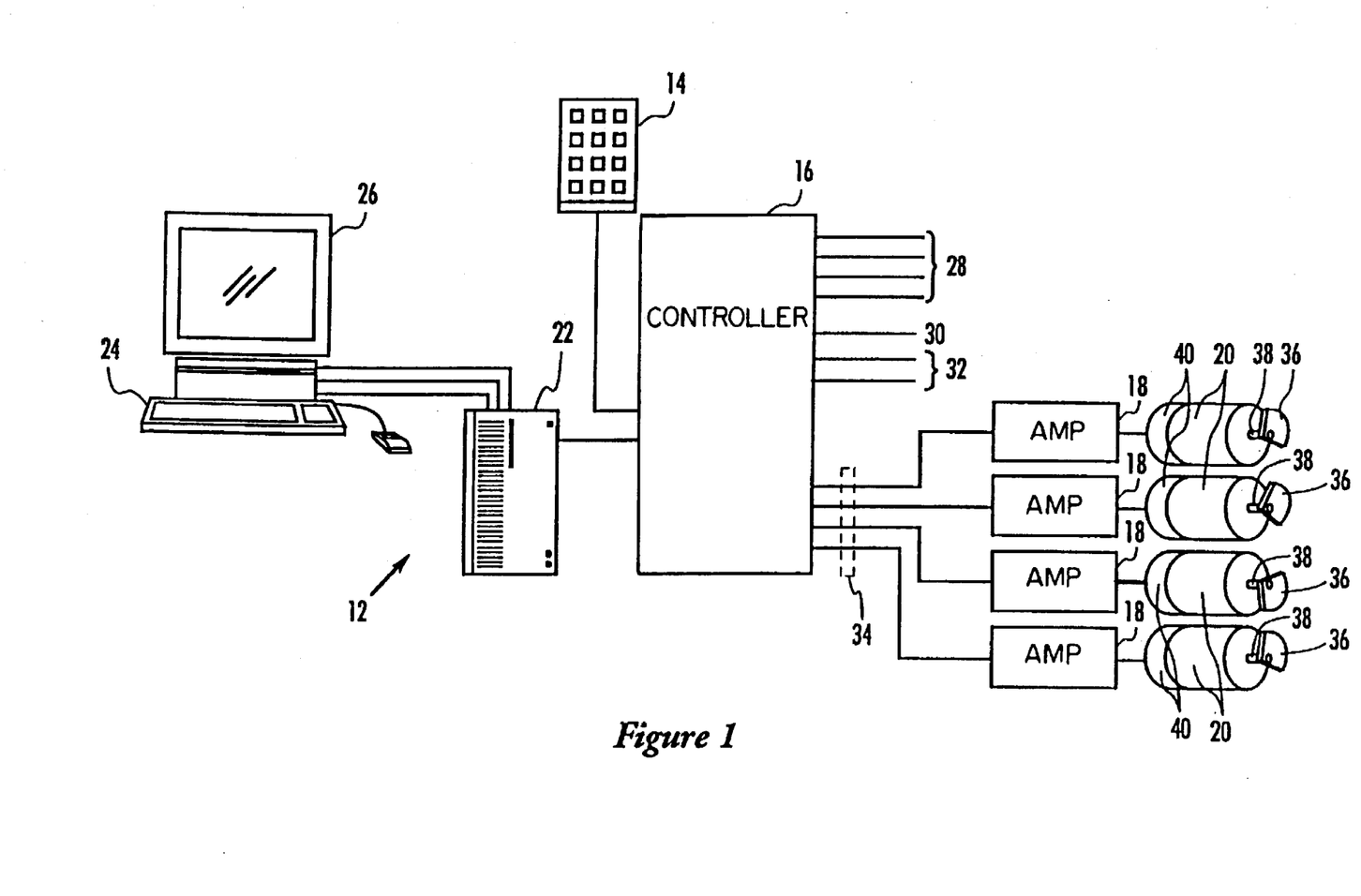
FIG. 1 is a block diagram of an exemplary motion control system in which a tuning technique in accordance with the invention may be implemented.

Turning now to the drawings and referring to FIG. 1, an exemplary motion control system 10 in which the present tuning technique may be implemented is illustrated as including a programming station 12, an operator interface 14, a controller 16, servo amplifiers 18 and actuators 20. As illustrated in FIG. 1, programming station 12 may include a stand-alone or networked computer 22, including a keyboard 24 and monitor 26 for interfacing with controller 16 during the tuning sequence described below as well as during ordinary operation of system 10. Interface 14 may be provided for similar interfacing, including altering control parameters, inputting desired position and velocity values and the like. Controller 16, which will be described in greater detail below, preferably includes a digital signal processing unit for receiving input and configuration commands from station 12 and interface 14 and implementing a predetermined control routine for moving actuators 20. Controller 16 typically includes several axis-specific discrete input/output lines 28 for communicating with external devices (not shown), a processor watchdog connection 30 for monitoring failure of controller 16 and power connections 32 for coupling controller 16 to a source of AC or DC power.

Input/output connections 34 are provided for communicating control signals from controller 16 to servo amplifiers 18 and for receiving feedback signals. Each servo amplifier 18 is coupled to a corresponding actuator 20 for positioning a physical element, represented generally by the reference numeral 36. As will be appreciated by those skilled in the art, actuators 20 may be AC or DC motors, hydraulic or pneumatic cylinders, or any other suitable transducer for converting control or drive signals into displacement of physical elements 36. Moreover, physical elements 36 may include gears coupled to a mechanical drive system, pistons, linkages and the like. Thus, although the following discussion generally refers to physical elements 36 coupled to an output shaft 38 of a motor 20, it should be understood that this discussion merely relates to an exemplary application of the invention. A feedback signal generating device 40 is associated with each actuator 20 and generates feedback signals representative of the position of physical element 36. These feedback signals are communicated to controller 16, preferably through a counter 42 (see FIG. 2).

By way of example only, controller 16 may be of the type available commercially from the Allen-Bradley Company under the designation "IMC S Class Compact" motion controllers. Such devices typically provide real-time closed loop position control for 2 or 4 axes. A servo amplifier 18, actuator 20 and feedback device 40 are provided for each controlled axis and interconnections between these devices are made via standard cable assemblies. In the presently preferred embodiment, feedback devices 40 are rotary or linear quadrature-type incremental encoders, such as optical encoders, that provide both position and velocity feedback. Encoder counters 42 preferably include optically isolated input buffers, programmable decode logic and 16-bit encoder counters. Counters 42 thus provide precise, absolute position feedback to controller 16 for accurately positioning physical elements 36.

Figure 2:
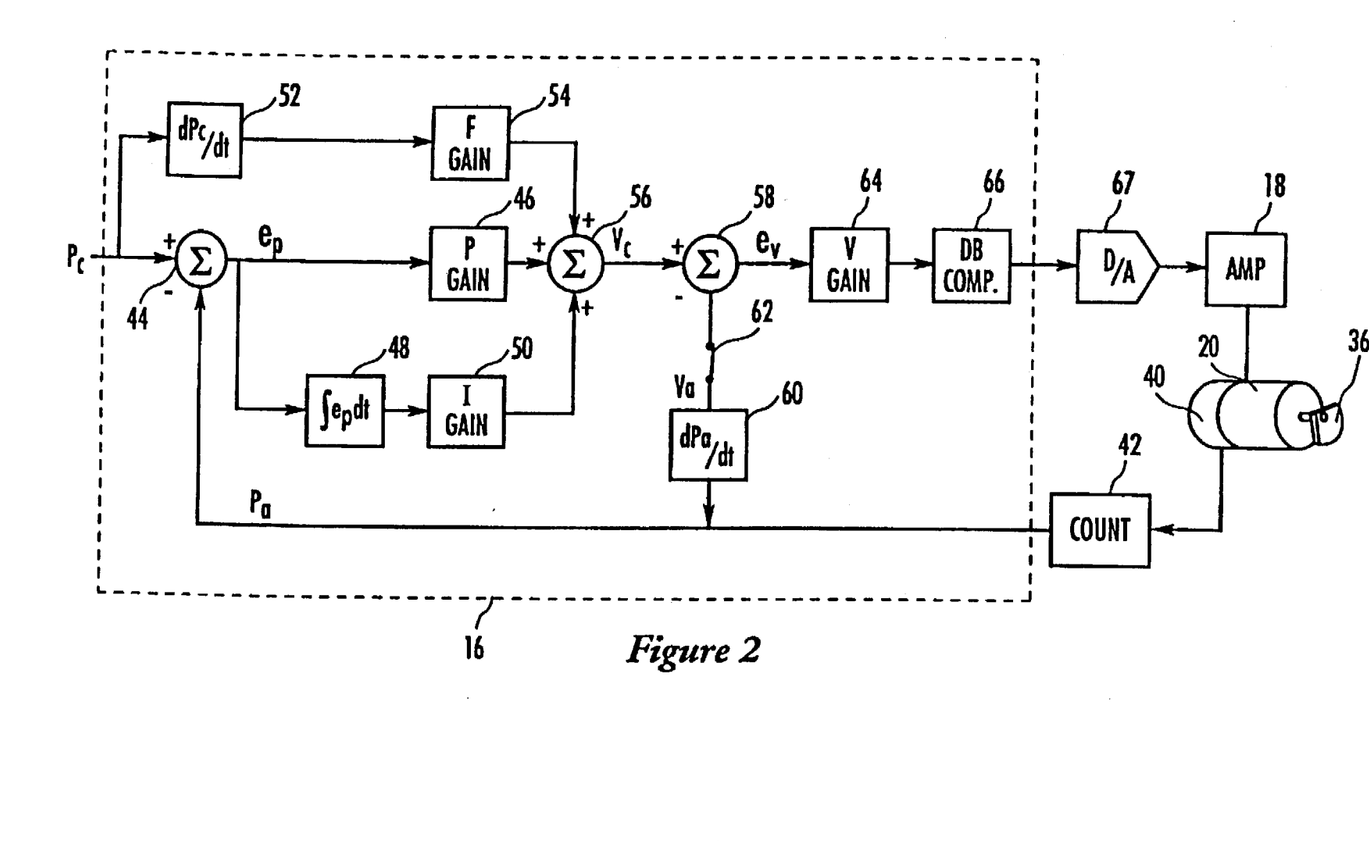
FIG. 2 is a block diagram for a typical control routine implemented by the control system illustrated in FIG. 1.

The present tuning technique may be implemented to tune gain and system dynamics values in a control system routine represented diagrammatically in FIG. 2. It should be understood that while the particular routine described below is preferred, it is presented here by way of example only. The present tuning technique is not intended to be limited to the particular system configuration described. Moreover, while the control routine illustrated in FIG. 2 generally has the same logical structure for each controlled axis, the particular parameters, particularly the position and velocity loop gains discussed below, are typically individually configured, effectively resulting in a set of control routines implemented simultaneously and specifically tailored to each controlled axis.

In the routine depicted in FIG. 2, a position command signal $P_c$ is input from a command device, such as programming station 12 or interface 14. Although the position command signals can be manually input through these devices, in many applications, such as machining and assembly processes, they will typically be developed as part of a larger process control routine. The command signal $P_c$ is combined at a summer 44 with a negative position feedback signal $P_a$ to generate a position error signal $e_p$. Position feedback signal $P_a$ is generated by counter 42 based upon the output of feedback device 40 and is representative of the actual position of physical element 36. Position error signal $e_p$ is multiplied by a position proportional gain $K_{p(pos)}$ at block 46. Position error signal $e_p$ is also applied to an integrating block 48 where the error is summed over a predetermined number of control cycles to determine a time integral of the position error. This integral position error is multiplied by a position integral gain $K_{i(pos)}$ at block 50, and serves to reduce steady state position error due to such factors as static friction. In addition to being summed with the feedback signal $P_a$, the position command signal $P_c$ is applied to a differentiating block 52 where the time derivative of the position command is generated as part of a velocity feedforward loop. The resulting velocity command signal $V_c$ is multiplied by a feedforward gain $K_{ff}$ at block 54.

From blocks 54, 46 and 50, the conditioned error and command signals are summed at a summing point 56. The resulting signal, representative of a velocity command $V_c$, is added to a negative velocity feedback signal $V_a$ at a summer 58 to generate a velocity error signal $e_v$. In the preferred embodiment represented in FIG. 2, to create a stable position servo loop without using an analog tachometer, damping is provided by synthesizing a tachometer in the velocity loop. Thus, a signal $V_a$ representative of the actual velocity of physical element 36 is provided by generating the time derivative of the position feedback signal $P_a$ at block 60. Because the control routine illustrated in FIG. 2 can implement control on the basis of either an external torque (i.e. current) loop or an external velocity loop, a velocity loop closing path, represented schematically by switch 62 is provided between differentiating block 60 and summer 58. The velocity loop of the routine can be closed by closing switch 62, effectively simulating an external velocity control loop within controller 16. The tuning routine described below generally assumes this configuration. On the other hand, opening switch 62, such as through the initial setup configuration of controller 16, interrupts the velocity feedback path, effectively placing velocity loop control outside of controller 16.

In the configuration illustrated in FIG. 2, the velocity error signal $e_v$ from summer 58 is multiplied by a proportional velocity gain value $K_{p(vel)}$ at block 64 and the resulting signal is added to a deadband offset value at block 66. The deadband offset value affords compensation for frictional effects on system 10 when using torque (current) loop servo amplifiers. The resulting control signal is range limited to avoid motion of physical element 36 outside the permissible dynamic ranges of system 10 and applied to a digital-to-analog converter 67. Such range limiting typically includes comparing the control signal to signal levels corresponding to known system limits, such as the maximum allowable actuator velocity and maximum acceleration and deceleration rates. Based upon the level of this control signal, converter 67 generates drive signals to drive actuator 40 through servo amplifier 18 in a range of plus-to-minus 10 volts or plus-to-minus 150 mA, depending upon the nature of servo amplifier 18.

Figure 3:
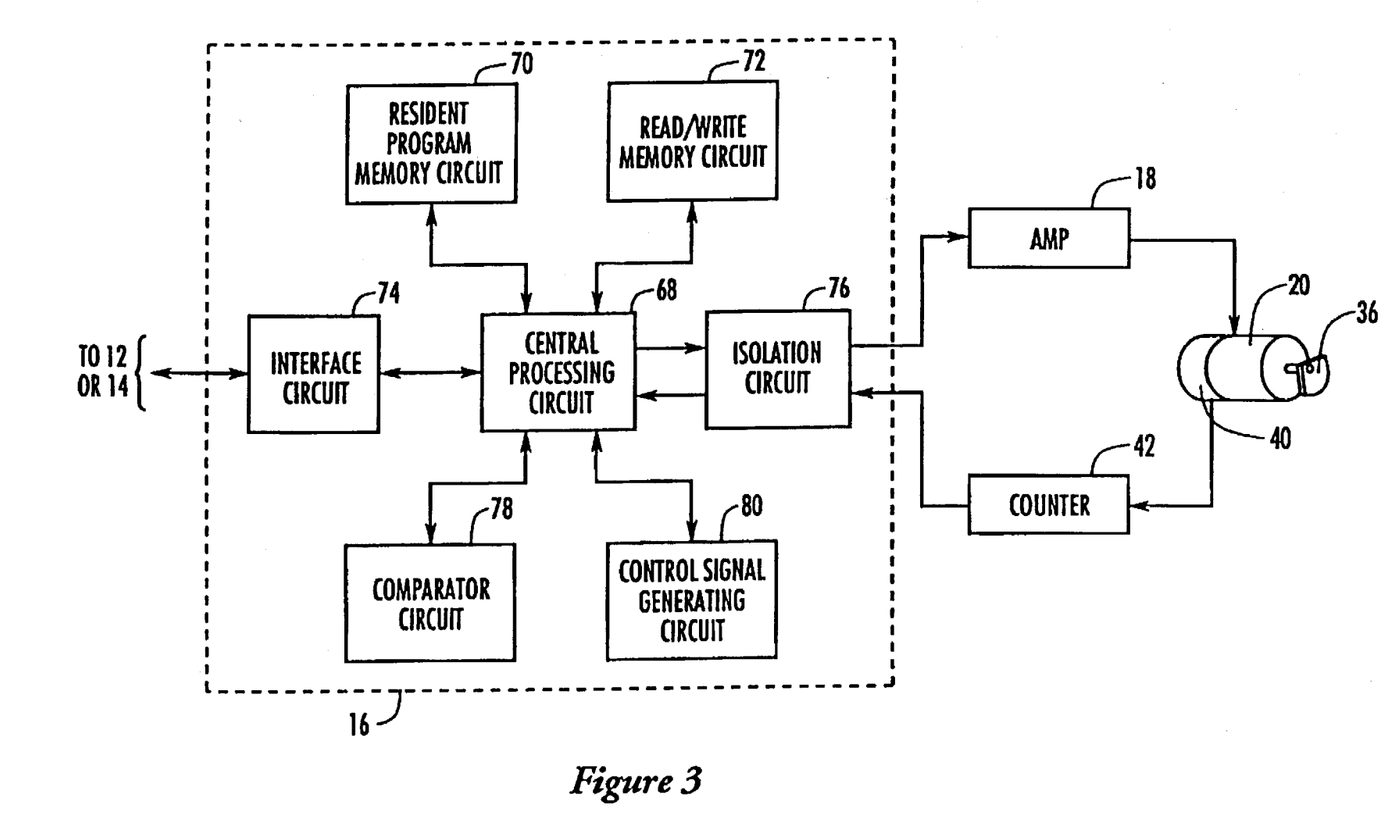
FIG. 3 is a diagrammatical illustration of certain functional circuits included in an apparatus for carrying out the tuning technique in accordance with the invention.

Certain of the functional circuits comprising controller 16 for carrying out the control routine summarized above are represented schematically in FIG. 3. As shown in FIG. 3, a central processing circuit 68 includes internal circuitry, typically defined during configuration or programming of circuit 68 for carrying out a cyclic control routine through execution of encoded logic. A resident program memory circuit 70 permanently stores the control routine, while a read/write memory circuit 72 temporarily stores parameter values needed for execution of the control routine. To permit tuned values to be semi-permanently stored for use in the control routine but reconfigured if desired, memory circuit 72 preferably includes non-volatile memory for storing such values, such as EPROM or EEPROM.

In operation, central processing circuit 68 receives command signals from programming station 12, interface 14 or any other suitable command signal source through an interface circuit 74. Feedback signals from device 40 are also applied to central processing circuit 68 through an appropriate isolation circuit 76. Central processing circuit 68 cycles through the control routine stored in memory circuit 70 and, based upon the command and feedback signals received, performs the signal comparisons summarized above in a comparison circuit 78 to determine position and velocity error values. Using these error values, the command and feedback signals and the tuned gain and system dynamics values, central processing circuit 68 calls upon a control signal generating circuit 80 in accordance with the control routine, to produce control signals to be converted by converter 67 and conditioned by servo amplifier 18. In response to the control signals, servo amplifier 18 generates drive signals for moving actuator 20 and thereby physical element 36, to reduce the error signals to zero. These functional circuits may be substantially identical to those presently found in known position control systems, such as the IMC S Class Compact controllers mentioned above.

Figure 4A:
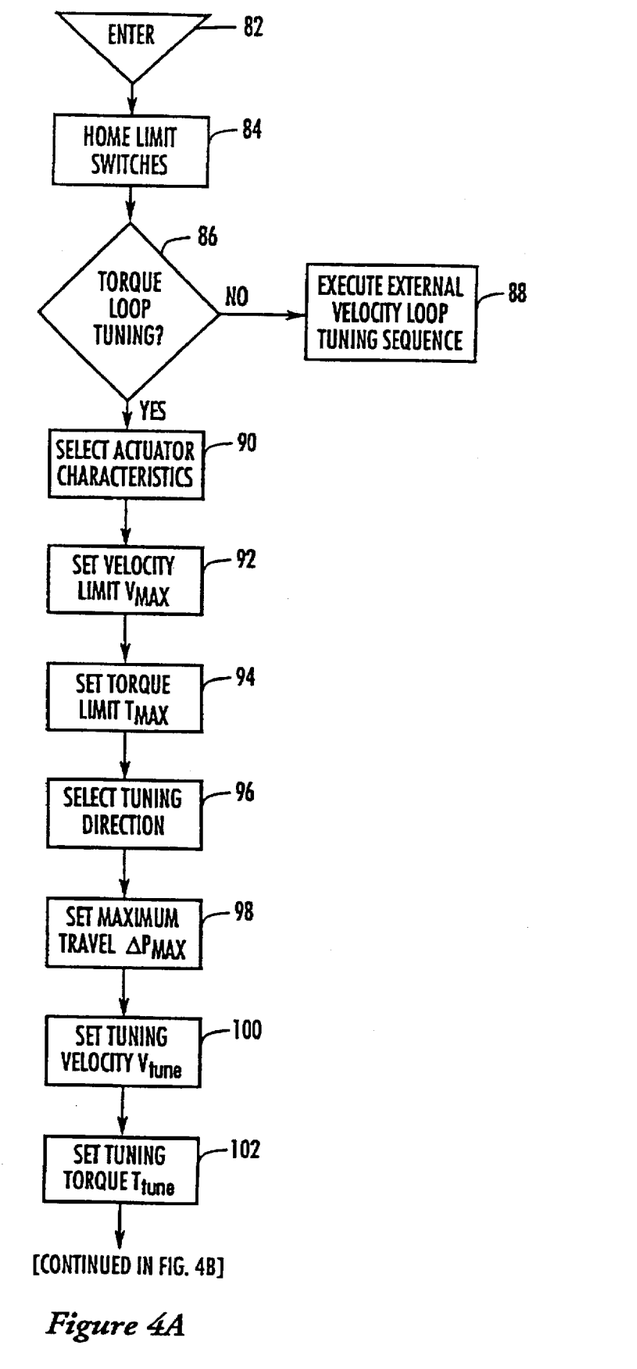
Figure 4B:
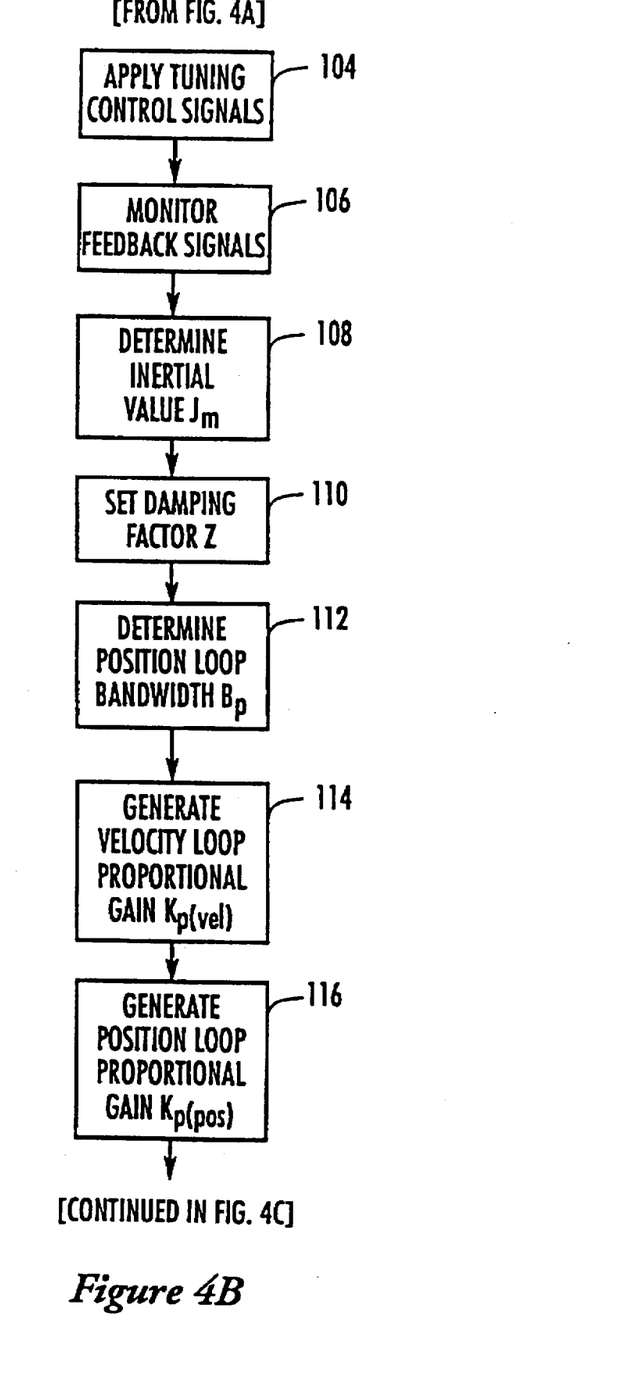
Figure 4C:
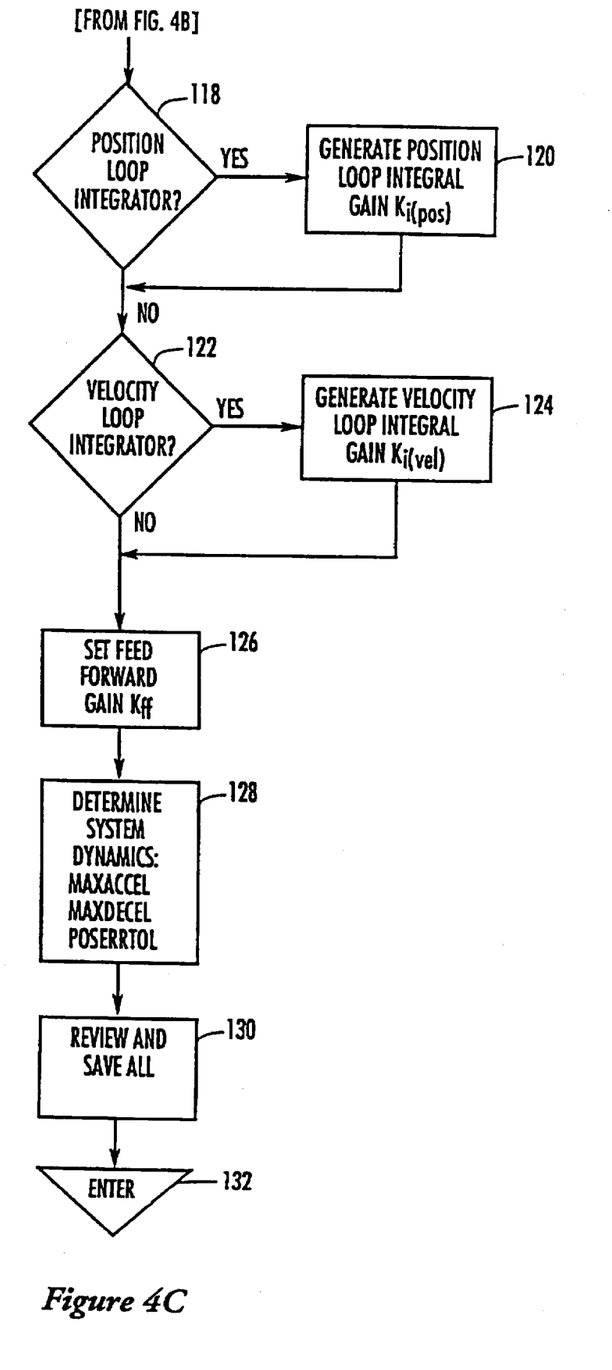

The present tuning technique permits key parameters used by the functional circuitry discussed above, particularly system gains and dynamic parameters, to be simply and easily set at optimal levels. FIGS. 4A, 4B and C summarize typical control logic for carrying out this tuning technique for a motion control system such as that described above. Such logic will ordinarily be incorporated in an appropriately configured (programmed) controller 16, and is conveniently stored in resident program memory circuitry 70. Moreover, various operator interfaces may be envisioned permitting interactive control of the tuning sequence and programs incorporating such interfaces may be stored in computer 22 of programming station 12. The presently preferred interface is a mouse-driven setup interface supported on an Intel 486 personal computer platform.

Throughout the following discussion, several important advantages of the tuning technique should be noted. A first advantage resides in the use of a single, unidirectional motion event to gather the information needed to tune system gains as well as to determine system dynamic parameters such as maximum acceleration and deceleration rates. Moreover, by drawing upon key relationships between the velocity and position loops of the system, particularly between the bandwidths of the velocity and position loops, the tuning sequence permits optimal tuning of both control loops through a straightforward set of calculations carried out by the controller circuitry. In addition, because the system dynamic parameters are determined based upon the motion event, very little information need be known by the system operator prior to tuning. In the preferred embodiment described below, only the drive type (i.e. velocity or torque) and the maximum allowable velocity (or the percentage of the full output range useable by the drive) need be supplied by the operator. All other necessary parameters are either assumed by the system or determined during the tuning sequence.

As illustrated in FIG. 4A, the tuning sequence begins by entering a servo setup menu at block 82. At step 84, the operator is prompted to select the particular control axis to be tuned. As described above, control system 10 may implement control routines for several control axes simultaneously, with each axis having an independently commanded actuator coupled to a servo amplifier and a position sensor for producing position and velocity indicative feedback signals. Thus, based upon the selection made at step 84, where gains and dynamic parameters for several different control axes are being tuned, the following steps will be performed for each axis. At step 86, the operator is asked whether the servo amplifier 18 of the axis being tuned is being programmed as a torque loop servo drive or a velocity loop servo drive. As discussed above, for systems configured to operate as a torque loop servo drive, the preferred control routine simulates a velocity loop and conditions position feedback signals to simulate an external tachometer. On the other hand, providing the option for configuring the control system as an external velocity loop servo drive permits the same controller to be interfaced with servo amplifiers whose performance characteristics are unknown to the controller. If the axis is not being tuned as a torque loop system, an external velocity loop tuning sequence is entered at step 88. However, as the external velocity loop tuning sequence does not form part of the present invention, it will not be discussed in detail. It should be noted that as subsequent controlled axes are tuned, responses to the query at block 86 may differ, resulting in certain axes being tuned and controlled as torque loop servo drives while other axes are controlled as velocity loop servo drives.

Beginning at step 90, parameters related to particular constraints of the system elements are selected. At step 90, where the actuator 20 having known performance characteristics is used in control system 10, the operator may be prompted to select from a predetermined menu of actuators. Generally, selecting a particular actuator at this step results in using certain known limits, such as the maximum velocity and torque associated with the selected actuator, for the axis tuning. At block 92, the maximum allowable velocity $V_m$ for the axis being tuned may be selected. At block 94, the maximum allowable torque $T_m$ is selected. Where known velocity and torque limits associated with the actuator 20 are available, these may be used as default values at steps 92 and 94. Moreover, even where such actuator-based values are available, the operator may prefer other limits within physical constraints of the elements coupled to the actuator. Furthermore, as mentioned above, no specific information relating to the preformance characteristics of the drive, the actuator or the feedback device need be known to proceed through the following tuning sequence. Overall system dynamics capabilities, including maximum acceleration and deceleration rates are determined based upon the system performance during the motion event described below.

Beginning at step 96, parameters and constraints used by controller 16 to define the motion event used to tune the axis are selected. Thus, at step 96, the tuning direction is selected.

The present tuning technique requires a single, unidirectional motion event to determine key parameters required for system tuning, as opposed to multiple oscillatory (i.e. bidirectional) motion events used in previous position control system tuning approaches. Therefore, at step 96 the operator may choose the most convenient direction of motion for the actuator. At step 98, the maximum allowable travel in the direction selected at step 96 is selected. Controller 16 uses this value as a physical constraint in generating the control signals for the motion event as described below. At step 100, the maximum velocity desired for the tuning sequence is selected. In the motion event described below, controller 16 and servo amplifier 18 will accelerate actuator 20 from a velocity of zero up to a desired velocity, $V_{tune}$, set at step 100. This value is typically selected in terms of position units per second and may be range limited to the maximum velocity limit optionally set at step 92 for the axis. At step 102, the maximum tuning output limit is selected. For torque loop drive configuration, this value will typically be a maximum output torque level, $T_{tune}$, and is preferably selected in terms of a percentage of the maximum torque limit set at step 94. It should be noted that the parameter selection steps outlined above permit the tuning sequence to proceed based upon a motion event wherein the tuning torques, velocities and travel are considerably less than the full system limits. Such flexibility is advantageous in many applications where it is desirable to tune the control system with minimal movement of the physical elements coupled to the axis actuator.

At step 104, with the tuning parameters thus selected, control signal generating circuit 80 develops tuning control signals and central processing circuit applies these signals, through A/D converter 67, to servo amplifier 18 to accelerate and decelerate actuator 20 as follows. For torque loop servo drives, tuning control signals are generated to drive actuator 20 at the tuning torque set at step 102 until the actuator reaches the velocity set at step 100, as determined by monitoring feedback signals from device 40. When the tuning velocity is reached, control signals are generated to decelerate actuator 20 at the tuning torque level. As indicated at step 106, throughout the motion event, feedback signals from device 40 are monitored and key values are stored for use in determining the system gain values.

Figure 5:
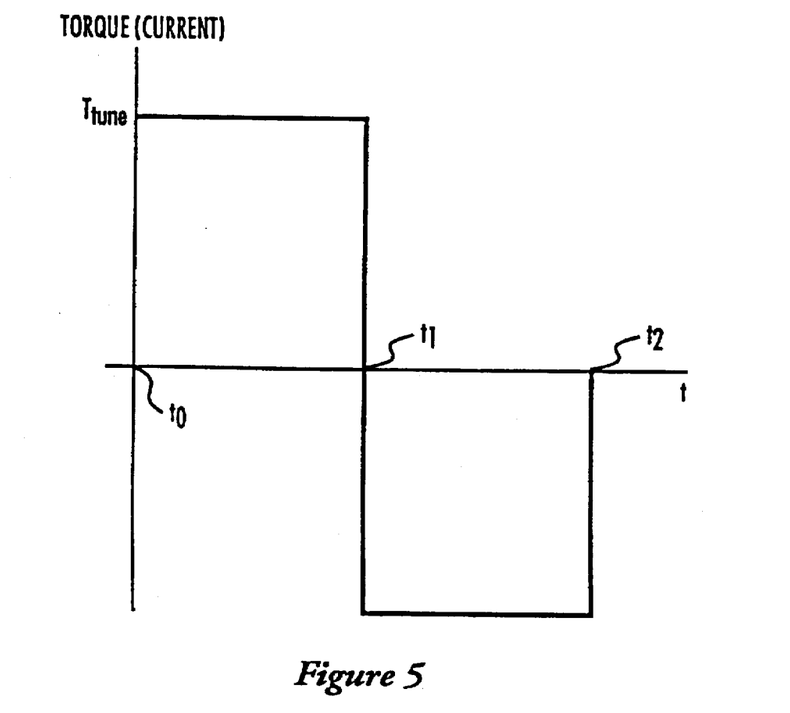
FIG. 5 is a graphical representation of control signals transmitted to a servo amplifier of the control system of FIG. 1 during implementation of the present tuning technique.
Figure 6:
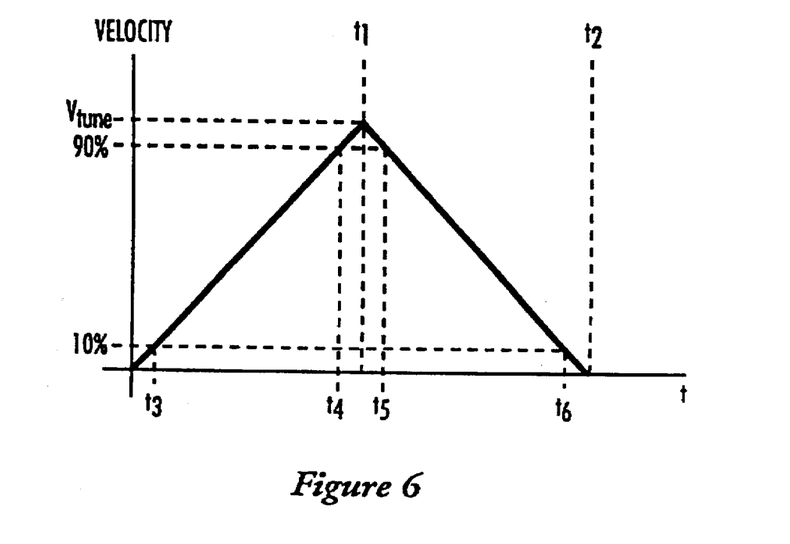
FIG. 6 is a graphical representation of the velocity profile for the actuator of the system of FIG. 1 in response to the control signals illustrated in FIG. 5.

Graphically, the control signals generated and applied during this motion event and the velocity of actuator 20 generally have the profiles illustrated in FIGS. 5 and 6, respectively. Beginning at a time $t_0$, a control signal (typically a controlled current signal for torque loop servo drives) is output by controller 16 at the level set at step 100. At a time $t_1$, when actuator 20 reaches the tuning velocity $V_{tune}$ set at step 102, controller 16 applies a control signal tending to decelerate actuator 20. By time $t_2$, the control signal has brought actuator 20 to zero velocity. During this time, central processing circuit 68 monitors the times and feedback signals and stores in memory circuit 72 values representative of times $t_3$, $t_4$, $t_5$ and $t_6$, when actuator 20 reaches 10% and 90% of velocity $V_{tune}$ during acceleration and deceleration.

At step 108, based upon the tuning parameters and the feedback signals received during the motion event, central processing circuit 68 determines a value representative of the effective inertia of control system 10. For this determination, an acceleration time, $t_a$, and a deceleration time, $t_d$, are calculated as follows:

$$t_a = t_4 - t_3 \quad (1);$$

$$t_d = t_6 - t_5 \quad (2).$$

The effective inertia value, $J_m$, is then calculated in accordance with the relationship:

$$J_m = 2 * T_{tune}/((V/t_a) + (V/t_d)) \quad (3),$$

where V is 80% of $V_{tune}$. This effective inertia value, while not a direct measurement of the true physical inertia of system 10, provides an indication of the relative drive strength and mechanical inertias of the combined system components. The preferred technique for determining this value uses the spans of velocity between 10% and 90% of to avoid distortional effects of acceleration changes at the beginning and end of the acceleration and deceleration phases of the motion event.

At step 110, a damping factor Z is selected. In the preferred embodiment, a default value of 0.8 is used for Z, although values between 0.7 and 2.0 may be selected. The damping factor Z, used in the gain calculations described below, effectively determines the aggressiveness of the control system in responding to command signal changes, a higher value generally resulting in a slower response or a "sluggish" system and a lower value generally resulting in a rapid or "hotter" response.

At step 112, central processing circuit 68 calculates the position loop bandwidth $B_p$ in accordance with the relationship:

$$B_p = 0.0625 * C_p/(T_g * Z^4) \quad (4),$$

where $C_p$ is a position accumulator constant and $T_g$ is a lumped velocity loop delay. The position accumulator constant $C_p$ is generally a conversion factor for relating position or displacement to velocity. For example, for rotational actuators such as DC motors, the position accumulator constant will typically be expressed in revolutions per thousand RPM-second (rev/KRPM-sec). The lumped velocity loop delay, which is generally dependent on the controller updating ram and circuitry configuration, is also a fixed value associated with the control system and may generally be determined empirically without undue experimentation for the controller 16 being tuned.

At step 114, based upon the position loop bandwidth, central processing circuit 68 calculates the position loop proportional gain $K_{p(pos)}$ in accordance with the relationship:

$$K_{p(pos)} = C_p * B_p \quad (5).$$

For motion control systems of the type described above including both position and velocity loops, it has been determined that a key relationships exist between the position and velocity loops when properly tuned. For example, it should be noted that the position loop bandwidth $B_p$ as generated from equation (4) above is based not only on the position accumulator constant $C_p$, but on the lumped velocity loop delay and damping factor as well. In addition, it has been determined that the maximum velocity loop bandwidth is obtained when the velocity loop proportional gain $K_{p(vel)}$ (generated at step 116 as described below) is set to a specific value based upon the effective inertia $J_m$, the damping factor Z and the lumped velocity loop delay $T_g$. This relationship may be expressed in terms of the position loop bandwidth by the following equation for the velocity loop proportional gain $K_{p(vel)}$:

$$K_{p(vel)} = J_m * 4 * B_p * Z^2 \quad (6).$$

At step 116, central processing circuit 68 generates a velocity loop proportional gain $K_{p(vel)}$ based upon equation (6) to close the velocity loop. Thus, it should be noted that while certain known servo control systems implementing a velocity loop only, such as the series 1391 Digital Servo Drives available from the Allen-Bradley Company, have made use of an effective inertia value for tuning velocity loop gains, the present tuning technique effectively ties position and velocity loops in a motion control system, permitting both loops to be interdependently and optimally tuned in a single procedure. It should also be noted from equations (4), (5) and (6) that, given the system constants $C_p$ and $T_g$ and the effective inertia value $J_m$ determined from the motion event, the velocity loop proportional gain value $K_{p(vel)}$ and the position loop proportional gain value $K_{p(pos)}$ are interrelated by the damping factor Z. Again, the basis for this relationship is the interdependence of the position and velocity loop bandwidths in the properly tuned system, which is given by the equation:

$$B_p = \frac{1}{16} * B_v / Z^4 \quad (7);$$

where $B_v$ is the velocity loop bandwidth. Now that both proportional gains have been generated, integral gains may be computed.

At step 118, where a position loop integrator block 50 (see FIG. 2) is desired, central processing circuit 68 may be instructed to generate a position loop integral gain value $K_{i(pos)}$ at step 120, in accordance with the following relationship:

$$K_{i(pos)} = 0.25 * (1/C_p) * K_{p(pos)}^2 \quad (8).$$

If a position loop integral gain block is not desired, central processing circuit 68 sets the position loop integral gain value equal to zero and proceeds to step 122. At step 122, a velocity loop integral gain value $K_{i(vel)}$ may be generated if desired. If a velocity loop integrator (not shown in FIG. 2) is desired, central processing circuit 68 determines the appropriate gain value in accordance with the relationship:

$$K_{i(vel)} = 0.25 * (1/J_m) K_{p(vel)}^2 \quad (9).$$

In practice, however, where a position loop integrator is selected this is generally sufficient to reduce steady state position error as well as velocity error, making a velocity loop integrator superfluous. Where the velocity loop integrator is not desired, central processing circuit sets the gain value equal to zero.

At step 126, central processing circuit 68 sets a velocity command feedforward gain value $K_f$. In the presently preferred embodiment, where a feedforward gain is desired, central processing circuit 68 sets this gain at unity. Where no command velocity feedforward is desired, the gain value is set equal to zero.

At step 128, central processing circuit 68 determines key system dynamic characteristics, including maximum acceleration rate, maximum deceleration rate and position error tolerance. The maximum acceleration and deceleration rates are calculated based upon the acceleration and deceleration rates detected during the tuning motion event as follows:

$$Maxaccel = (T_m/T_{tune}) * (V/T_a) * 0.85 \quad (10);$$

$$Maxdecel = (T_m/T_{tune}) * (V/T_d) * 0.85 \quad (11).$$

Thus, in the preferred embodiment, the maximum acceleration and deceleration rates are set to 85% of their full scale values. Other limits on acceleration and deceleration could, of course, be imposed. The position error tolerance is calculated in accordance with the relationship:

$$Poserrtol = 2 * (V_m/I)/K_{p(pos)} \quad (12),$$

where I is the feedback interrupt period for the position loop, a constant value that will be known upon configuration of controller 16. In operation, the control routine implemented by central processing circuit 68 typically treats the maximum acceleration and deceleration rates as physical constraints not to be exceeded in moving actuator 20 in response to changes in command position signals. The position error tolerance may be used by central processing circuit 68 as a tolerance limit during operation. For example, the control routine implemented by controller 16 may cyclically compare the actual position error to the error tolerance and, if the error is found to exceed the tolerance, the drive may be disabled, motion may be stopped or an alarm or other status indicator may be energized to signal that the position error tolerance has been exceeded.

At step 130, all of the gain values and system dynamic limits are displayed on monitor 26 for review. At this point, the gain values and system limits may be altered if desired or may be confirmed at the values determined by central processing circuit 68. All values set during the tuning sequence are then saved in memory circuit 72. At step 132, central processing circuit 68 exits the tuning sequence and is free either to tune another axis by returning to step 82 or to proceed with normal execution of the control routine stored in memory circuit 70. The tuned axis is now application ready.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

We claim:

1. A method for tuning a motion control system of the type including a command device for generating position command signals, an actuator for displacing a physical element to a desired location in response to control signals, a sensor for generating feedback signals representative of the position of the physical element and a controller coupled to the command device, the sensor and the actuator for processing the command and feedback signals and generating control signals for driving the actuator in response to the command and feedback signals, the controller multiplying at least one parameter error signal derived from the command and feedback signals by a gain value to generate the control signals, the method comprising the steps of:

(a) applying a first control signal to the actuator to accelerate the actuator in a predetermined direction during a single motion event;

(b) applying a second control signal to the actuator to decelerate the actuator in the predetermined direction during the single motion event;

(c) recording values representative operating parameters of the control system during steps (a) and (b); and (d) generating the gain value based upon the recorded operating parameters.

2. The method of claim 1, wherein the actuator is an electric motor and the parameters recorded in step (c) include electrical current applied to the actuator, actuator velocity, acceleration time and deceleration time and the gain value generated in step (d) is based upon the first and second control signals, the actuator velocity, the acceleration time and the deceleration time.

3. The method of claim 1, wherein the controller is configured to implement a position feedback control loop and a velocity control loop and wherein at step (d) gain values are generated for the position and velocity loops.

4. The method of claim 3, wherein the controller is configured to generate a velocity loop gain value based upon a parameter of the position loop.

5. The method of claim 1, wherein at step (d) the gain value is generated based upon a value representative of system inertia derived from the operating parameter values recorded at step (c).

6. A method for tuning a motion control system of the type including a command device for generating position command signals, an actuator for displacing a physical element to a desired location in response to drive signals, a sensor for generating feedback signals representative of the position of the physical element and a controller coupled to the command device, the sensor and the actuator for processing the command and feedback signals and generating drive signals for driving the actuator in response to the command and feedback signals, the controller multiplying at least one parameter error signal derived from the command and feedback signals by a gain value to generate the drive signals, the method comprising the steps of:

(a) applying a first drive signal at a predetermined level to the actuator to accelerate the actuator to a predetermined velocity;

(b) applying a second drive signal at a predetermined level to the actuator to decelerate the actuator;

(c) monitoring feedback signals during the acceleration and deceleration and recording acceleration and deceleration times; and (d) generating the gain value based upon a value representative of system inertia derived from the predetermined levels of the first and second drive signals, the acceleration and deceleration times and the feedback signals.

7. The method of claim 6, wherein step (d) includes converting the monitored feedback signals to values representative of velocity of the actuator during the acceleration and deceleration times, the gain value being generated based upon the levels of the drive signals, the acceleration and deceleration times and the velocity values.

8. The method of claim 6, wherein the controller is configured to implement a position feedback control loop and a velocity control loop and wherein at step (d) gain values are generated for the position and velocity loops.

9. The method of claim 8, wherein the controller is configured to generate a velocity loop gain value based upon a parameter of the position loop.

10. The method of claim 6, including the further step of generating a value representative of a maximum system acceleration rate based upon the predetermined level of the acceleration drive signal and the acceleration time.

11. The method of claim 6, including the further step of generating a value representative of the maximum system deceleration rate based upon the predetermined level of the deceleration drive signal and the deceleration time.

12. A method for tuning a motion control system of the type including a command device for generating position command signals, an actuator for displacing a physical element to a desired location in response to drive signals, a sensor for generating feedback signals representative of the position of the physical element and a controller coupled to the command device, the sensor and the actuator for processing the command and feedback signals and generating drive signals for driving the actuator in response to the command and feedback signals, the method comprising the steps of:

(a) applying a first drive signal at a predetermined level to the actuator to accelerate the actuator to a predetermined velocity;

(b) applying a second drive signal at a predetermined level to the actuator to decelerate the actuator;

(c) monitoring feedback signals during the acceleration and deceleration and recording acceleration and deceleration times;

(d) generating a position loop bandwidth value; and (e) generating values representative of system gains and dynamic characteristics based upon the predetermined levels of the first and second drive signals, the acceleration and deceleration times and the position loop bandwidth value.

13. The method of claim 12, wherein the gains generated at step (e) include velocity and position loop proportional gains.

14. The method of claim 13, wherein the dynamic characteristics values generated at step (e) include the maximum system acceleration and the maximum system deceleration.

15. An apparatus for tuning a motion control system of the type including an input device for generating position command signals, an actuator for displacing a physical element to a desired location, a drive circuit for driving the actuator in response to control signals, a sensor for generating feedback signals representative of the position of the physical element and a controller coupled to the input device, the sensor and the drive circuit for processing the command and feedback signals and generating control signals for driving the actuator in response to the command and feedback signals, the controller multiplying at least one parameter error signal derived from the command and feedback signals by a gain value to generate the control signals, the apparatus comprising:

a control signal generating circuit coupled to the drive circuit for generating and applying control signals to the drive circuit to accelerate and decelerate the actuator during a tuning sequence, the tuning sequence including a single, unidirectional motion event wherein the actuator is accelerated in a predetermined direction and then decelerated in the predetermined direction;

a processing circuit coupled to the sensor and to the control signal generating circuit for monitoring the feedback signals during the tuning sequence and for generating a signal representative of the gain value based upon the control signals applied during the tuning sequence and the feedback signals monitored during the tuning sequence; and a memory circuit for storing the signal representative of the gain value.

16. The apparatus of claim 15, wherein the control signal generating circuit, the processing circuit and the memory circuit are included in a digital signal processor.

17. The apparatus of claim 15, wherein the drive circuit includes a servo amplifier.

18. The apparatus of claim 15, wherein the actuator is an electric motor.

19. The apparatus of claim 15, wherein the control signal generating circuit, the processing circuit and the memory circuit are included in the controller, and wherein the apparatus further includes an operator interface coupled to the controller for monitoring operation of the controller.

* * * * *